(12) United States Patent
Sin

(10) Patent No.: US 7,969,952 B2
(45) Date of Patent: Jun. 28, 2011

(54) METHOD OF IMPLEMENTING MULTICAST ROUTING SYSTEM IN MOBILE AD-HOC NETWORK ENVIRONMENT

(75) Inventor: Jin-hyun Sin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 11/542,199

(22) Filed: Oct. 4, 2006

(65) Prior Publication Data

US 2007/0076633 A1 Apr. 5, 2007

(30) Foreign Application Priority Data

Oct. 4, 2005 (KR) .................. 10-2005-0093099

(51) Int. Cl.
*H04W 4/00* (2009.01)
(52) U.S. Cl. ........ 370/338; 370/254; 370/255; 370/256; 709/242; 714/2; 714/3
(58) Field of Classification Search .................. 370/408
See application file for complete search history.

(56) References Cited

U.S. PATENT DOCUMENTS

| | | | | |
|---|---|---|---|---|
| 5,941,955 | A * | 8/1999 | Wilby et al. ................ | 709/242 |
| 6,917,985 | B2 * | 7/2005 | Madruga et al. ............. | 709/238 |
| 7,403,482 | B2 * | 7/2008 | Izmailov et al. ............. | 370/238 |
| 7,403,492 | B2 * | 7/2008 | Zeng et al. .................. | 370/254 |
| 2002/0145978 | A1 * | 10/2002 | Batsell et al. ................ | 370/238 |
| 2002/0176399 | A1 | 11/2002 | Wilmer | |
| 2003/0233594 | A1 * | 12/2003 | Earl ................................ | 714/4 |

FOREIGN PATENT DOCUMENTS

| | | |
|---|---|---|
| JP | 08-037535 A | 2/1996 |
| JP | 2002-199013 A | 7/2002 |
| WO | 2005/055529 A1 | 6/2005 |

OTHER PUBLICATIONS

Naga, Katsuyuki et al. "Safety confirmation system for large-scale disasters based on Multi-agent System" Technical Report of IEICE, NS 2004-122, vol. 104, No. 273, p. 113-117. Aug. 27, 2004.

* cited by examiner

*Primary Examiner* — Charles N Appiah
*Assistant Examiner* — Natasha Cosme
(74) *Attorney, Agent, or Firm* — Sughrue Mion, PLLC

(57) ABSTRACT

Disclosed is a method of implementing a multicast routing system in a mobile ad-hoc network environment. The method includes causing control packets for data transmission to be transmitted from a source node to object nodes in accordance with a predetermined method when data to be transmitted from the source node to the object nodes exists, forming, in a tree structure, information concerning nodes on paths through which the control packets are transmitted, and causing the source node to transmit the data to the object nodes using the formed tree structure.

4 Claims, 3 Drawing Sheets

METHOD OF IMPLEMENTING MULTICAST ROUTING SYSTEM IN MOBILE AD-HOC NETWORK ENVIRONMENT

CROSS-REFERENCE TO RELATED APPLICATIONS

This application claims priority from Korean Patent Application No. 10-2005-0093099 filed on Oct. 4, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to a routing protocol, and more particularly, to a method of implementing a multicast routing system in a mobile ad-hoc network environment.

2. Description of the Related Art

A mobile ad-hoc network is designed for forming a temporary network among wireless mobile apparatuses to perform communication among the respective wireless mobile apparatuses. Therefore, the mobile ad-hoc network is very different from an existing wire network.

Wireless mobile apparatuses ("nodes") have mobility, and provide a function of transmitting or receiving various types of data.

Examples of a method for transmitting data to nodes in a mobile ad-hoc network environment include a unicast method for transmitting data to only one specific node, a multicast method for transmitting data to a plurality of grouped nodes, and a broadcast method for transmitting data to all nodes belonging to a mobile ad-hoc network without designating a specific node or group.

Examples of a multicast routing protocol in a mobile ad-hoc network environment include: MAODV (Multicast Ad-hoc On-demand Distance Vector), ODMRP (On-demand Multicast Routing Protocol), MOLSR (Multicast extension for the Optimized Link State Routing protocol), and the like. These protocols use a flooding method.

However, due to special circumstances in wireless communication, a number of nodes that firstly transmits data ("source nodes") or a number of node groups, each of which is composed of a plurality of nodes ("groups"), increases, which results in a loss of control information. As a result, transmission rates of data packets are rapidly lowered.

In particular, in the case of the ODMRP, overhead for control packets and the amount of used network bandwidth increase substantially as much as the overhead for control packets or the amount of used network bandwidth according to a flooding method.

SUMMARY OF THE INVENTION

An exemplary aspect of the present invention provides a method of implementing a multicast routing system that is effective and stable in a mobile ad-hoc network environment.

Another exemplary aspect of the present invention provides a method of implementing a multicast routing system that is effective and reliable even if the number of source nodes or the number of groups is increased in a mobile ad-hoc network environment.

The aspects of the invention are not limited to the above-described exemplary aspects, and other aspects of the invention not described herein will become clear to those skilled in the art upon review of the following description.

According to an exemplary aspect of the invention, a method of implementing a multicast routing system in a mobile ad-hoc network environment includes causing control packets for data transmission to be transmitted from a source node to object nodes in accordance with a predetermined method when data to be transmitted from the source node to the object nodes exists, forming, in a tree structure, information concerning nodes on paths through which the control packets are transmitted, and causing the source node to transmit the data to the object nodes using the formed tree structure.

BRIEF DESCRIPTION OF THE DRAWINGS

The above and other exemplary aspects and advantages of the present invention will become more apparent by the following detailed description of preferred embodiments thereof with reference to the attached drawings in which.

DETAILED DESCRIPTION OF EXEMPLARY EMBODIMENTS OF THE INVENTION

The present invention may, be embodied in many different forms and should not be construed as being limited to the exemplary embodiments set forth herein. Rather, these exemplary embodiments are provided so that this disclosure will convey the concept of the invention to those skilled in the art. Like reference numbers refer to like elements throughout the specification.

It is assumed in the present invention that nodes belonging to a mobile ad-hoc network system have information regarding other nodes belonging to the mobile ad-hoc network system.

Figure 1:
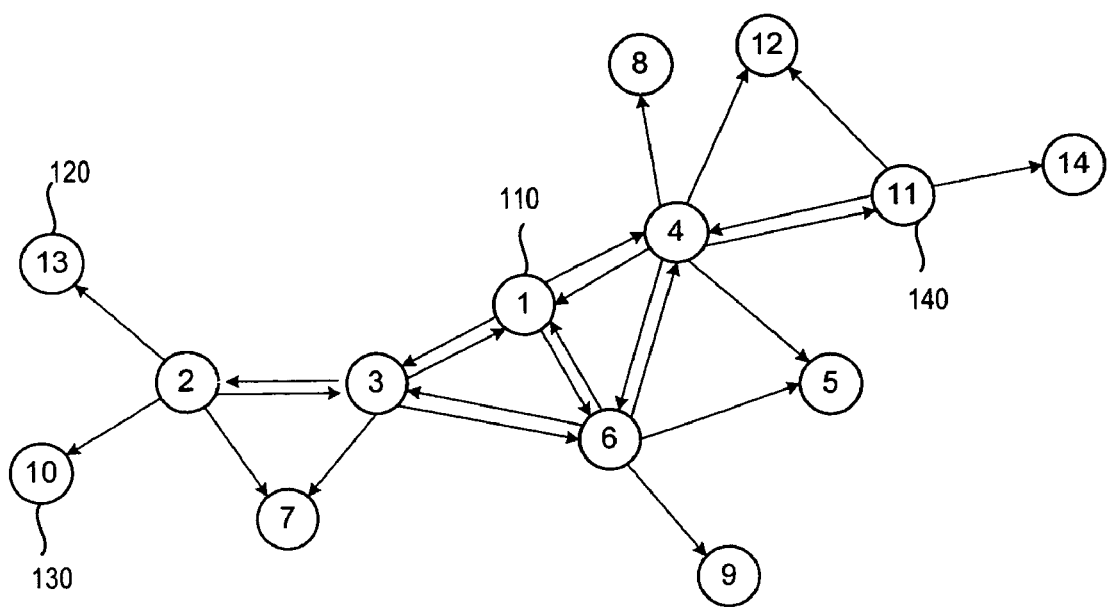
FIG. 1 is an exemplary view illustrating a mobile ad-hoc network system according to an embodiment of the invention.

FIG. 1 is an exemplary view illustrating a mobile ad-hoc network system according to an embodiment of the invention. A method of implementing a multicast routing system according to an exemplary embodiment of the invention will be described on the basis of a system 100 shown in FIG. 1.

In the mobile ad-hoc network environment, when a source node (first node) 110 transmits data packets to nodes 120, 130, and 140 that belong to a specific group, the data packets that are transmitted from the source node 110 can be transmitted to the nodes 120, 130, and 140 that belong to the specific group by using a method of implementing a multicast routing system according to an exemplary embodiment of the invention in the network.

At this time, the multicast routing according to the exemplary embodiment of the present invention will be referred to as on-demand multi-point relay (MPR) flooding.

The on-demand MPR flooding serves to reduce excessive use of a bandwidth that generally occurs with conventional flooding methods and improves the conventional flooding.

According to the on-demand MPR flooding method, when data to be transmitted exists at the source node, after information of neighboring nodes is studied through the flooding process, two-hop neighboring nodes are determined by using the studied information, and an MPR is selected.

In the conventional MPR flooding method, information of adjacent nodes is studied through packets, such as hello packets, which are periodically broadcast from the respective nodes that form the mobile ad-hoc network, and then an MPR is selected.

However, according to the on-demand MPR flooding method according to the exemplary embodiment of the invention, flooding is only performed when data to be transmitted from the source node exists. Accordingly, even when data to be transmitted, such as the hello packets, does not exist, it is possible to reduce the periodic transmission of control packets.

When the source node transmits the data packets to a specific group, the source node determines whether the control packets transmitted through a one-hop broadcast method are transmitted through a general flooding method or transmitted through an MPR flooding method.

The source node determines a flooding method to be used in accordance with a predetermined method.

For example, when data to be transmitted from the source node exists, the following method can be used until all data is transmitted. First, at intervals of five seconds: the general flooding method is used twice, the conventional MPR flooding method is used three times, the general flooding method is used twice again, and the conventional flooding method is used three times again. That is, the conventional general flooding method and the conventional MPR flooding method are periodically used in an alternating manner.

Referring to FIG. 1, adjacent nodes (third, fourth, and sixth nodes) that are one hop away from the source node first receive control packets that are transmitted from the source node (first node) (110) in accordance with a one-hop broadcast method.

Then, the general flooding method is used, and the adjacent nodes (third, fourth, and sixth nodes) retransmit the received control packets in accordance with a one-hop broadcast method. When the conventional MPR flooding method is used, the nodes that are adjacent to the MPR node retransmit the received control packets in a one-hop broadcast method.

In this process, for example, the source node (first node) (110) may receive the information transmitted from the third node. As a result, the source node 110 is aware that that the third, fourth, and sixth nodes are adjacent nodes of the source node 110 that are one hop away from the source node 110.

Furthermore, the source node (first node) is aware, through the flooding of the respective adjacent nodes (third, fourth, and sixth nodes), that the second and seventh nodes are adjacent nodes of the third node that are one hop away from the third node, and eighth, twelfth, eleventh, and fifth nodes are adjacent nodes of the fourth node that are one hop away from the fourth node.

In this way, the source node 110 is aware that the second, seventh, eighth, twelfth, eleventh, and fifth nodes are two hops away from the source node 110.

This is possible because a control packet transmitted during the course of flooding includes not only information about a single recipient node, but also information for adjacent nodes that are one hop away from the recipient node.

According to the above-described method, each of the nodes shown in FIG. 1 can store information, in a type of routing table, for adjacent nodes that are one hop or two hops away from the node.

When the routing table does not vary, the source node (first node) selects as an MPR node a node which is one-hop away and has the most number of two-hop adjacent nodes among those nodes that are one-hop away and can transmit packets with two hops by an MPR calculation. Thus, the control packet transmission through the network is in accordance with the MPR flooding method.

The routing table may be used so as to determine the MPR node, and the control packet may be allowed to include information for the MPR node so as to designate the MPR node.

The control packet is transmitted in accordance with the flooding method, and the control packet includes information for the source node.

If flooding is repeated in this way, the control packet is finally transmitted to object nodes 120, 130, and 140 that have been designated as the receiving nodes by the source node. These object nodes correspond to nodes that are grouped in accordance with the multicast method.

The object nodes designate as a parent node a node which transmits the control packet to the object nodes, and transmits to the parent node a "join request packet" indicating that the object nodes exist in accordance with the unicast method. At this time, the parent node records the object nodes as child nodes in its routing table.

Then, the object nodes designate as a parent node a node that transmits the control packet to the object nodes again, and transmit a join request packet to the parent node in accordance with the unicast method. At this time, as described above, the node that has received the join request packet records as child nodes the nodes that transmit the join request packet in its routing table.

This process is repeated and thus the join request packet transmitted from the object nodes are transmitted to the source node, which results in forming a tree structure that is composed of nodes that receive or transmit the join request packet. This is because the nodes that receive or transmit the join request packet include information for the child nodes and the parent nodes in their routing tables.

This process will be exemplified with reference to FIG. 1.

For example, if the object node is the tenth node (130), the tenth node 130 designates as a parent node the second node which transmits the control packet to the tenth node 130, and transmits the join request packet to the second node in accordance with the unicast method.

The second node receives the join request packet transmitted from the tenth node 130, and then designates as a child node the tenth node 130 which transmits the join request packet to the second node and designates as a parent node the third node which transmits the control packet to the second node. Then, the second node transmits the join request packet to the third node in the unicast method.

The third node receives the join request packet transmitted from the second node, and then designates as a child node the second node which transmits the join request packet to the third node and designates as a parent node the source node 110 which transmits the control packet to the third node. Then, the third node transmits the join request packet to the source node 110 in the unicast method.

The source node 110 designates as the child node the third node which transmits the join request packet to the source node.

In the meantime, the thirteenth node 120 designates as a parent node the second node which transmits the control packet to the thirteenth node 120 and transmits the join request packet to the second node in the unicast method.

Then, the second node receives the join request packet transmitted from the thirteenth node 120, and then designates the thirteenth node 120 as a child node. At this time, the second node is already designated as the child node of the third node by the third node, and the third node is designated as the parent node of the second node by the second node. Therefore, the second node does not need to transmit the join request packet to the third node.

In this way, the relationships between the parent nodes and the child nodes can be established among the source node 110, the fourth node, and the eleventh node 130, and each node has information for its parent node and child node.

Figure 2:
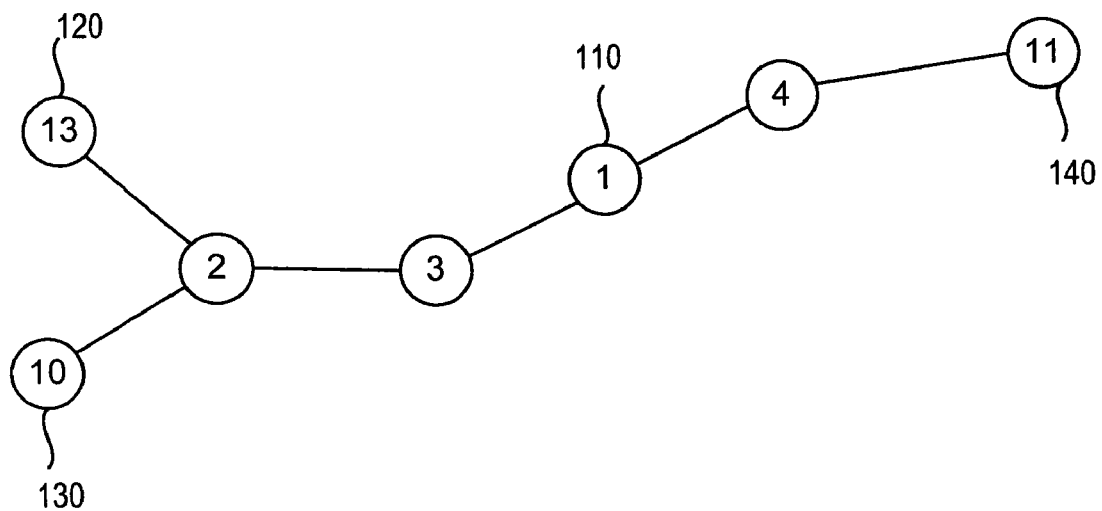
FIG. 2 is an exemplary view illustrating a tree structure which is formed of a source node and multiple object nodes according to an embodiment of the invention.

According to this method, a tree structure can be formed which is composed of the source node 110 and the object nodes 120, 130, and 140 for the source node 110, which is illustrated in FIG. 2.

If the tree structure is formed by this method, the source node 110 may transmit the data packets to the object nodes 120, 130, and 140 in accordance with the multicast method.

The source node 110 transmits the data packets to the adjacent nodes (third, fourth, and sixth nodes) in accordance with a one-hop broadcast method.

At this time, each of the third node and the fourth node, which correspond to child nodes of the source node, confirms whether each node has its child node, and then retransmits the data packet having received from the source node 110 in accordance with a one-hop broadcast method.

This process is repeated, and thus the object nodes 120, 130, and 140 may receive the data packets transmitted from the source node 110.

Figure 3:
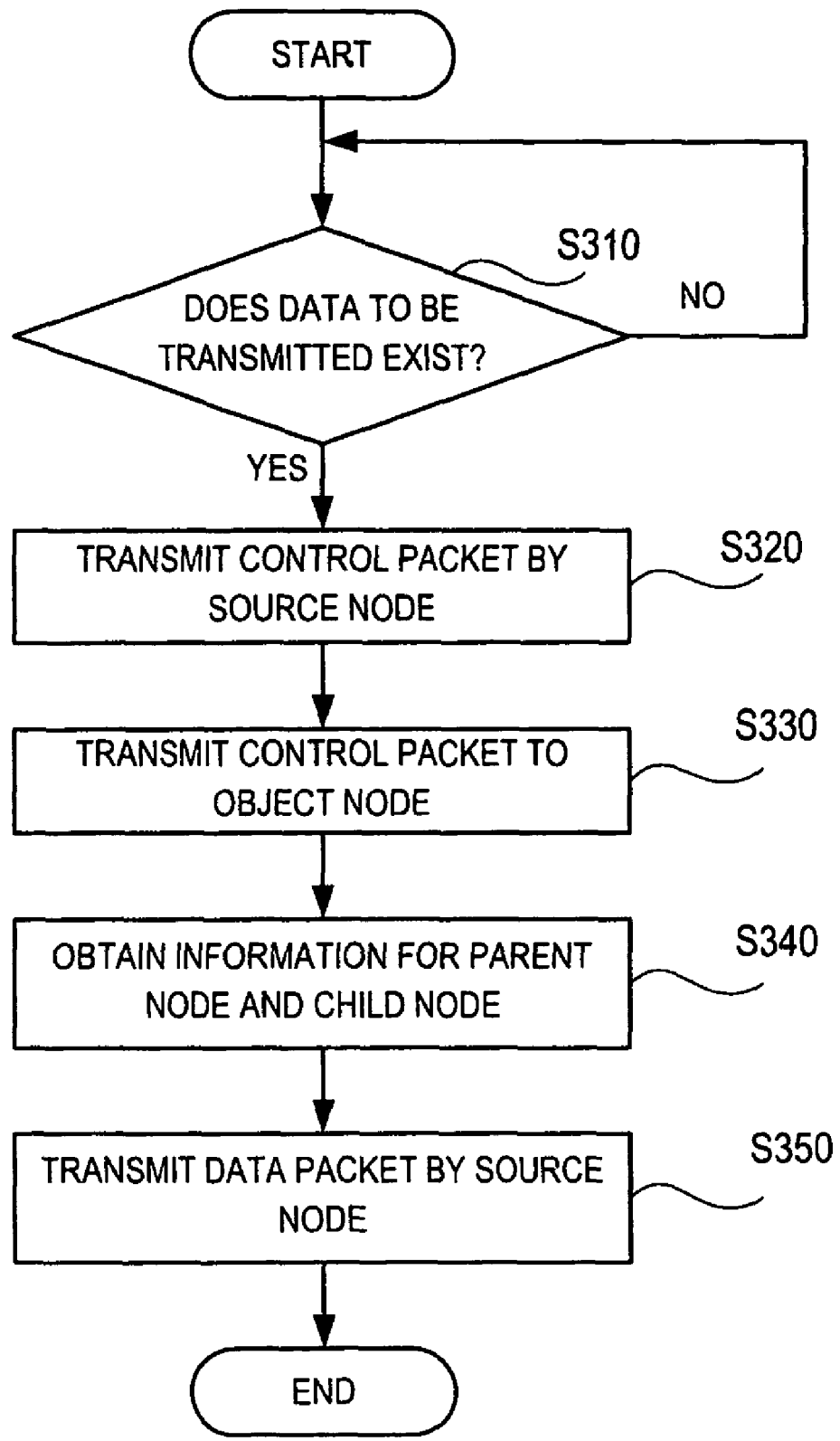
FIG. 3 is a flowchart illustrating a method of implementing a multicast routing system in a mobile ad-hoc network environment according to an embodiment of the invention.

FIG. 3 is a flowchart illustrating a method of implementing a multicast routing system in a mobile ad-hoc network environment according to an exemplary embodiment of the invention.

The source node confirms whether data to be transmitted to the object node exists (S310).

If the data to be transmitted to the object node exists, the source node transmits the control packet for data transmission in accordance with a one-hop broadcast method (S320). However, if the data to be transmitted to the object node does not exist, the source node does not transmit a separated control packet for data transmission.

The control packet transmitted from the source node is transmitted to object nodes through a plurality of nodes in accordance with a flooding method (S330). Then, each of the nodes existing on a path through which the control packet is transmitted between the source node and the object nodes by using the join request packet stores information for its parent node and child node (S340). Since the specific method has been described in the above, it will be omitted herein.

If the join request packet is transmitted to the source node, the source node transmits the data packet to the adjacent nodes in accordance with a one-hop broadcast method, and the node among the adjacent nodes, which has a child node, transmits the data packet to its child node (S350). This method is repeated, and thus the data packet transmitted from the source node can be transmitted to the object nodes.

Figure 4:
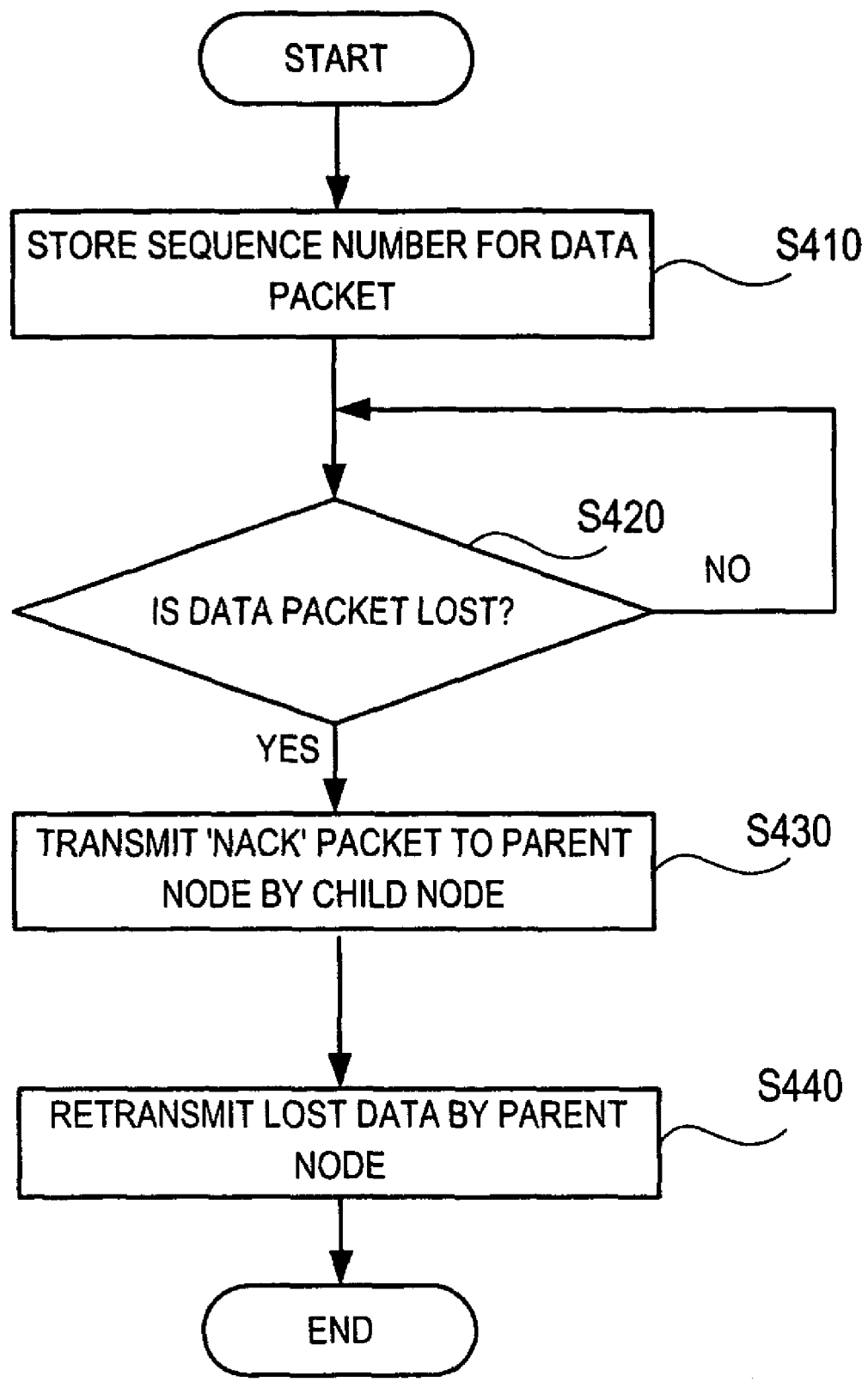
FIG. 4 is a flowchart illustrating a process for restoring a lost data packet in accordance with an embodiment of the invention.

FIG. 4 is a flowchart illustrating a process for restoring lost data packets in accordance with an exemplary embodiment of the invention.

While data is transmitted to the respective nodes through the wireless environment, the transmitted data may be lost.

In this case, in order to restore the lost data, the respective nodes temporarily store identification information like sequence numbers, which identify data packets transmitted through the source node, in a data structure like a queue (410).

Accordingly, when the child node receives data packets from the parent node, the child node tests the above-described sequence number, and determines whether the data packets have been lost.

When it is determined that the data packets have been lost (S420), the child node transmits to the parent node a "NACK" packet which requests to retransmit the data packet corresponding to the sequence number of the lost data packet (S430). The NACK packet may be transmitted in accordance with the unicast or one-hop broadcast method.

The parent node which has received the NACK packet retransmits the lost data packets to the child node (S440). For this retransmission, the parent node stores the data packets which the parent node transmits within a predetermined time.

In the meantime, when it is determined that the data packets are lost, the child node may wait for a predetermined time, and then may transmit the NACK packet to the parent node. This is to prevent the NACK packet from being repeatedly transmitted, because another child node may request its parent node to transmit the NACK packet for the same packet. At this time, the time for which the child node waits until the child node transmits the NACK packet to the parent node is transmitted is longer than the time when the data packet goes and returns once between the child node and the parent node (hereinafter, referred to as "1_HOT_RTT").

For example, when a MAC frame of an IEEE802.11 standard is used, the time 1_HOT_RTT becomes (1500 bytes.*8/ 11 Mbps). 2≈2 (msec).

In the meantime, in some cases, the parent node shown in FIG. 4 may not have the lost data packet.

For example, in FIG. 1, it is assumed that even though the second node transmits to the third node the NACK packet requesting for retransmission of the tenth data packet, the third node does not also have the tenth data packet.

In this case, the third node transmits to the source node 110 corresponding to its parent node a "NACK_out_of-window" packet requesting for retransmission of the tenth data packet.

Then, the source node (110) transmits the tenth data packet to the second node through the third node.

That is, in the course of restoring the lost data packet, in the case in which the parent node corresponding to a host node in a tree structure cannot restore the lost data packets, the NACK packet, which is transmitted from the child node, is continuously transmitted to host nodes, and thus may be transmitted to the source node.

When the source node transmits the lost data packets, the source node reduces the transmission speed of the data packets so as to increase the transmission rate of the data.

According to the present disclosure, when the source node transmits the data by a multicast method in a mobile ad-hoc network environment, overhead for a control packet may be reduced.

Further, according to the present disclosure, even though the number of source nodes and the number of groups are increased, the data may be transmitted stably by a multicast method.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A method of implementing a multicast routing system in a mobile ad-hoc network environment, the method comprising:

transmitting control packets for data transmission from a source node to object nodes in accordance with a predetermined method when data to be transmitted from the source node to the object nodes exists;

forming, in a tree structure, information concerning nodes on paths through which the control packets are transmitted; and causing the source node to transmit the data to the object nodes using the formed tree structure;

wherein the causing the source node to transmit the data to the object nodes comprises, when the data transmitted to the object notes is lost:

causing a child node to transmit to a first parent node, which is a parent of the child node, identification information for identifying the lost data; and if the first parent node has the data packet corresponding to the identification information, causing the first parent node to transmit a data packet corresponding to the identification information to the child node; and if the first parent node does not have the data packet corresponding to the identification information, the first parent node to transmit the identification information to a second parent node, which is a parent of the first parent node, so as to request for the data packet corresponding to the identification information;

wherein the forming of the information concerning the nodes comprises:

causing the object nodes to transmit packets indicating the existence of the object nodes; causing the nodes existing on the paths, through which the control packets are transmitted between the source node and the object nodes, to store information concerning child nodes and parent nodes using the packets transmitted from the object nodes; and forming the tree structure from the stored information.

2. The method of claim 1, wherein the transmitting of the control packets from the source node to the object nodes comprises:

causing the source node to transmit the control packets; and transmitting the control packets to be transmitted to the object nodes through a plurality of nodes in accordance with a predetermined flooding method.

3. The method of claim 2, wherein the control packets are transmitted from the source node in accordance with a one-hop broadcast method.

4. The method of claim 2, wherein the flooding method comprises a multi-point relay flooding method.

* * * * *